United States Patent
He

(10) Patent No.: US 11,004,411 B2
(45) Date of Patent: May 11, 2021

(54) LIQUID CRYSTAL DISPLAY APPARATUS IMPROVING GAMMA CHARACTERISTIC OF DIFFERENT VIEWING ANGLES

(71) Applicant: HKC Corporation Limited, Shenzhen (CN)

(72) Inventor: Huailiang He, Shenzhen (CN)

(73) Assignee: HKC Corporation Limited, Shenzhen (CN)

(*) Notice: Subject to any disclaimer, the term of this patent is extended or adjusted under 35 U.S.C. 154(b) by 0 days.

(21) Appl. No.: 16/639,703

(22) PCT Filed: Nov. 15, 2017

(86) PCT No.: PCT/CN2017/111195
§ 371 (c)(1),
(2) Date: Feb. 17, 2020

(87) PCT Pub. No.: WO2019/037290
PCT Pub. Date: Feb. 28, 2019

(65) Prior Publication Data
US 2020/0243027 A1 Jul. 30, 2020

(30) Foreign Application Priority Data
Aug. 25, 2017 (CN) .......................... 201710744629.0

(51) Int. Cl.
G09G 3/36 (2006.01)
(52) U.S. Cl.
CPC ......... *G09G 3/3607* (2013.01); *G09G 3/3696* (2013.01); *G09G 2320/0633* (2013.01)

(58) Field of Classification Search
CPC ...... G09G 3/36; G09G 3/3607; G09G 3/3622; G09G 3/3625; G09G 3/364; G09G 3/3644;
(Continued)

(56) References Cited
U.S. PATENT DOCUMENTS 7,079,214 B2 * 7/2006 Shimoshikiryo ........................... G02F 1/134336 349/144
7,283,192 B2 * 10/2007 Shimoshikiryo ........................... G02F 1/134336 349/144

(Continued)

FOREIGN PATENT DOCUMENTS

| CN | 1482593 A | 3/2004 |
|---|---|---|
| CN | 101403838 A | 4/2009 |

*Primary Examiner* — Alexander Eisen
*Assistant Examiner* — Nelson Lam
(74) *Attorney, Agent, or Firm* — Wang Law Firm, Inc.

(57) ABSTRACT

A liquid crystal display device includes a liquid crystal layer which is divided into a plurality of pixels having a plurality of electrodes applying a voltage to the liquid crystal layer. Each pixel includes a first sub-pixel and a second sub-pixel. When each pixel displays a grayscale gk, the voltages applied to the liquid crystal layer of the first sub-pixel and second sub-pixel of each pixel are V1(gk) and V2(gk), and $\Delta V12(gk)=V1(gk)-V2(gk)$ is set, where $0 \leq gk \leq n$, and gk and n are integers greater than 0, and n represents the highest-brightness grayscale. When the grayscale gk is smaller than a predetermined grayscale gs, $\Delta V12(gk)>0V$ is set, and the relation $\Delta V12(gk)>\Delta V12(gk+1)$ is satisfied. When the grayscale gk is equal to or greater than the predetermined grayscale gs, $\Delta V12(gk)=0V$ is set, and the relation $\Delta V12(gk)=\Delta V12(gk+1)$ is satisfied.

17 Claims, 12 Drawing Sheets

(58) Field of Classification Search
CPC .. G09G 3/3648; G09G 3/3659; G09G 3/3696; G09G 2320/06; G09G 2320/0613; G09G 2320/0626
USPC .................................................. 345/87–104
See application file for complete search history.

(56) References Cited

U.S. PATENT DOCUMENTS

| | | | |
|---|---|---|---|
| 7,429,981 B2* | 9/2008 | Shimoshikiryoh | ........................ G02F 1/13624 345/204 |
| 2003/0222840 A1* | 12/2003 | Koga | ................... G09G 3/3696 345/89 |
| 2003/0227429 A1* | 12/2003 | Shimoshikiryo | ........................ G02F 1/134336 345/90 |
| 2005/0122441 A1* | 6/2005 | Shimoshikiryoh | .. G09G 3/3648 349/38 |
| 2005/0213015 A1* | 9/2005 | Shimoshikiryo | .... G09G 3/3655 349/144 |
| 2006/0256271 A1* | 11/2006 | Shimoshikiryo | ..... G02F 1/1393 349/144 |
| 2012/0327135 A1* | 12/2012 | Kitayama | ............ G09G 3/3651 345/690 |
| 2016/0189656 A1* | 6/2016 | Park | ................... G02F 1/13624 345/694 |

* cited by examiner

LIQUID CRYSTAL DISPLAY APPARATUS IMPROVING GAMMA CHARACTERISTIC OF DIFFERENT VIEWING ANGLES

CROSS-REFERENCE TO RELATED APPLICATION

This application is a National Stage Application of PCT International Patent Application No. PCT/CN2017/111195 filed on Nov. 15, 2017, under 35 U.S.C. § 371, which claims priority to and the benefit of Chinese Patent Application No. 201710744629.0, filed on Aug. 25, 2017, and the disclosure of which is incorporated herein in its entirety by reference.

FIELD

The present invention relates to the technical field of liquid crystal display (LCD) devices, in particular to the technology of improving the gamma ($\gamma$) characteristic of the liquid crystal display devices.

BACKGROUND

Description of the Related Art

A liquid crystal display device is a panel display device with the advantages of high resolution, thin shape, light weight, and low power consumption. In recent years, the display function, productivity, and price competition with other display devices are improved, and thus the market scale of the LCD devices expands rapidly.

A conventional twisted neumatic (TN) liquid crystal display device can arrange the long axis of the liquid crystal molecules with a positive dielectric rate and an anisotropy substantially parallel to the substrate surface, and carry the orientation processing, so that the long axis of the liquid crystal molecules can be twisted for substantially 90 degrees between the upper and lower substrates and along the thicknesswise direction of the liquid crystal layer. If a voltage is applied to the liquid crystal layer, the liquid crystal molecules are resumed to be parallel to the electric field to release the twisted orientation. The TN liquid crystal display device can control the transmittance by using the liquid crystal molecules according to the optical property of the orientation change of the voltage.

The TN liquid crystal display devices have excellent production margin and productivity. On a hand, there is a problem of the display function particularly the viewing angle characteristic. Specifically, the contrast of the display of the TN liquid crystal display device drops significantly when the display of the TN liquid crystal display device is viewed from an oblique direction, and the brightness difference between the grayscales become unobvious when the images of several grayscales from black to white are observed from the oblique direction and the front direction. On the other hand, the inversion of the grayscales of the display may result in a darker portion observed from the front and a brighter portion is observed from the oblique direction (which is known as "grayscale inversion").

In recent years, the TN liquid crystal display provided as a liquid crystal display device for improving the characteristic of the viewing angle is designed and developed with an in-plane switching (IPS) mode, a multi-domain vertical alignment (MVA) mode, an axially symmetric aligned microcell (ASM) mode, etc. The liquid crystal display device with these viewing angle modes can overcome the aforementioned problem with regard to the characteristic of the viewing angle. In other words, these liquid crystal display devices do not have the issues of having a significantly low contrast when viewing a display surface from an oblique direction or having a grayscale inversion of the display.

The so-called $\gamma$ characteristic refers to the dependence of grayscale indicating the brightness, and the $\gamma$ characteristic differs in the front direction and the oblique direction. Since the grayscale display status differs with the observing direction, therefore problems may occur easily in the case of showing the image of a photo or displaying a TV program. The problem of the viewing angle dependence of the $\gamma$ characteristic in the MVA and ASM modes is more obvious than that of the IPS mode. On one hand, it is very difficult to produce high contrast panels when viewing from the front side with high productivity, when the IPS is compared with the MVA and ASM modes. Based on these, the present invention expects to improve the viewing angle dependence of the $\gamma$ characteristic in the liquid crystal display devices of the MVA mode and/or the ASM mode.

SUMMARY

In view of the aforementioned problems of the prior art, it is a primary objective of the present invention to provide a liquid crystal display device capable of improving the conventional liquid crystal display device having the $\gamma$ characteristic of different viewing angles.

To achieve the aforementioned and other objectives, the present invention provides a liquid crystal display device including a liquid crystal layer. The liquid crystal layer is divided into a plurality of pixels and displayed in a normal-black manner. The plurality of pixels have a plurality of electrodes applying a voltage to the liquid crystal layer. Wherein, each of the pixels includes a first sub-pixel and a second sub-pixel, and a voltage is applied to the liquid crystal layer of each pixel separately; when each of the pixels displays a grayscale gk, the voltages applied to the liquid crystal layer of the first sub-pixel and the second sub-pixel of each pixel are V1(gk) and V2(gk) respectively, and $\Delta V12(gk)=V1(gk)-V2(gk)$ is set, wherein $0 \leq gk \leq n$, gk and n are integers greater than 0, and n stands for a highest-brightness grayscale. When the grayscale gk is smaller than a predetermined grayscale gs, $\Delta V12(gk)>0V$ is set, and the relation $\Delta V12(gk)>\Delta V12(gk+1)$ is satisfied, and when the grayscale gk is equal to or greater than the predetermined grayscale gs, $\Delta V12(gk)=0V$ is set, and the relation $\Delta V12(gk)=\Delta V12(gk+1)$ is satisfied.

Preferably, each of the pixels further includes a third sub-pixel which is different from the first sub-pixel and the second sub-pixel. When each of the pixels displays the grayscale gk, a voltage V3(gk) is applied to the liquid crystal layer of the third sub-pixel, and $\Delta V13(gk)=V1(gk)-V3(gk)$ is set, and when the grayscale gk is smaller than a predetermined grayscale gs, $\Delta V13(gk)>0V$ is set, and the relation $\Delta V12(gk)>\Delta V13(gk)$ is satisfied, and when the grayscale gk is equal to or greater than the predetermined grayscale gs, $\Delta V13(gk)=0V$ is set, and the relation $\Delta V12(gk)=\Delta V13(gk)$ is satisfied.

Preferably, the first sub-pixel includes a first transistor electrically coupled to a first source line, and the second sub-pixel includes a second transistor electrically coupled to a second source line. The first source line and the second source line are parallel to each other and provide a voltage signal to the first sub-pixel and the second sub-pixel separately. The first transistor and the second transistor are electrically coupled to a gate line and provide the same scan signal to the first sub-pixel and the second sub-pixel.

Preferably, when the voltage V1(gk) is smaller than a predetermined voltage Vs, ΔV12(gk)>0V is set, and the relation ΔV12(gk)>ΔV12(gk+1) is satisfied, and when the voltage V1(gk) is equal to or greater than the predetermined voltage Vs, ΔV12(gk)=0V is set, and the relation ΔV12(gk) =ΔV12(gk+1) is satisfied.

Preferably, the highest-brightness grayscale n is 256, and the predetermined grayscale gs is 128.

Preferably, the pixels are array pixels.

In a preferred embodiment of the present invention, a liquid crystal display device includes a liquid crystal layer. The liquid crystal layer is divided into a plurality of pixels and displayed in a normal-black manner. The plurality of pixels have a plurality of electrodes for applying a voltage to the liquid crystal layer. Wherein, each of the pixels includes a first sub-pixel and a second sub-pixel, and a voltage is applied to the liquid crystal layer of each pixel separately. When each of the pixels displays a grayscale gk, the voltages applied to the liquid crystal layer of the first sub-pixel and the second sub-pixel of each pixel are V1(gk) and V2(gk) respectively, ΔV12 (gk)=V1 (gk)−V2 (gk) is set, wherein 0≤gk≤n, gk and n are integers greater than 0, and n stands for the highest-brightness grayscale, and when the grayscale gk is smaller than a predetermined grayscale gs, ΔV12(gk)>0V is set, and the relation ΔV12(gk)=ΔV12(gk+ 1) is satisfied, and when the grayscale gk is equal to or greater than the predetermined grayscale gs, ΔV12(gk)=0V is set, and the relation ΔV12(gk)=ΔV12(gk+1) is satisfied.

Preferably, each of the pixels further includes a third sub-pixel which is different from the first sub-pixel and the second sub-pixel. When each of the pixels displays the grayscale gk, a voltage V3(gk) is applied to the liquid crystal layer of the third sub-pixel, and ΔV13(gk)=V1(gk)−V3(gk) is set, and when the grayscale gk is smaller than predetermined grayscale gs, ΔV13(gk)>0V is set, and the relation ΔV12(gk)>ΔV13(gk) is satisfied, and when the grayscale gk is equal to or greater than the predetermined grayscale gs, ΔV13(gk)=0V is set, and the relation ΔV12(gk)=ΔV13(gk) is satisfied.

Preferably, the first sub-pixel includes a first transistor electrically coupled to a first source line, and the second sub-pixel includes a second transistor electrically coupled to a second source line. The first source line and the second source line are parallel to each other and provide a voltage signal to the first sub-pixel and the second sub-pixel separately. The first transistor and the second transistor are electrically coupled to a gate line and provide the same scan signal to the first sub-pixel and the second sub-pixel.

Preferably, when the voltage V1(gk) is smaller than a predetermined voltage Vs, ΔV12(gk)>0V is set, and the relation ΔV12(gk)>ΔV12(gk+1) is satisfied, and when the voltage V1(gk) is equal to or greater than the predetermined voltage Vs, ΔV12(gk)=0V is set, and the relation ΔV12(gk) =ΔV12(gk+1) is satisfied.

Preferably, the highest-brightness grayscale n is 256, and the predetermined grayscale gs is 128.

Preferably, the pixels are array pixels.

In a preferred embodiment of the present invention, a liquid crystal display device includes a liquid crystal layer. The liquid crystal layer is divided into a plurality of pixels and displayed in a normal-black manner. The plurality of pixels have a plurality of electrodes applying a voltage to the liquid crystal layer. Wherein, each of the pixels includes a first sub-pixel and a second sub-pixel, and a voltage is applied to the liquid crystal layer of each pixel separately. When each of the pixels displays a grayscale gk, the voltages applied to the liquid crystal layer of the first sub-pixel and the second sub-pixel of each pixel are V1(gk) and V2(gk) respectively, ΔV12 (gk)=V1 (gk)−V2 (gk) is set, wherein 0≤gk≤n, gk and n are integers greater than 0, and n stands for the highest-brightness grayscale, and when the grayscale gk is smaller than a predetermined grayscale gs, ΔV12(gk) >0V is set, and the relation ΔV12(gk)>ΔV12(gk+1) is satisfied, and when the grayscale gk is equal to or greater than the predetermined grayscale gs, ΔV12(gk)=0V is set, and the relation ΔV12(gk)=ΔV12(gk+1) is satisfied.

Preferably, each of the pixels further includes a third sub-pixel which is different from the first sub-pixel and the second sub-pixel. When each of the pixels displays the grayscale gk, a voltage V3(gk) is applied to the liquid crystal layer of the third sub-pixel, and ΔV13(gk)=V1(gk)−V3(gk) is set, and when the grayscale gk is smaller than the predetermined grayscale gs, ΔV13(gk)>0V is set, and the relation ΔV12(gk)>ΔV13(gk) is satisfied, and when the grayscale gk is equal to or greater than the predetermined grayscale gs, ΔV13(gk)=0V is set, and the relation ΔV12 (gk)=ΔV13(gk) is satisfied.

Preferably, the first sub-pixel includes a first transistor electrically coupled to a first source line, and the second sub-pixel includes a second transistor electrically coupled to a second source line. The first source line and the second source line are parallel to each other and provide a voltage signal to the first sub-pixel and the second sub-pixel separately. The first transistor and the second transistor are electrically coupled to a gate line and provide the same scan signal to the first sub-pixel and the second sub-pixel.

Preferably, when the voltage V1(gk) is smaller than the predetermined voltage Vs, ΔV12(gk)>0V is set, and the relation ΔV12(gk)≥ΔV12(gk+1) is satisfied, and when the voltage V1(gk) is equal to or greater than the predetermined voltage Vs, ΔV12(gk)=0V is set, and the relation ΔV12(gk) =ΔV12(gk+1) is satisfied.

Preferably, the highest-brightness grayscale n is 256, and the predetermined grayscale gs is 128.

In a preferred embodiment of the present invention, a liquid crystal display device driving method is disclosed, and the liquid crystal display device includes a liquid crystal layer which is divided into a plurality of pixels. Each pixel includes a first sub-pixel and a second sub-pixel, and the pixels have a plurality of electrodes applying a voltage to the liquid crystal layer. The liquid crystal display device driving method, includes the following steps: when each of the pixels displays a grayscale gk, a voltage V1(gk) is applied to the first sub-pixel and a voltage V2(gk) is applied to the second sub-pixel, and ΔV12 (gk)=V1 (gk)−V2 (gk) is set, wherein 0≤gk≤n, and gk and n are integers greater than 0, and n stands for a highest-brightness grayscale, and when the grayscale gk is smaller than a predetermined grayscale gs, ΔV12(gk)>0V is set, and the relation ΔV12(gk)>ΔV12 (gk+1) is satisfied, and when the grayscale gk is equal to or greater than the predetermined grayscale gs, ΔV12(gk)=0V is set, and the relation ΔV12(gk)=ΔV12(gk+1) is satisfied.

Preferably, the liquid crystal display device driving method further includes the following steps: a voltage V3(gk) is applied to the liquid crystal layer of a third sub-pixel which is different from the first sub-pixel and the second sub-pixel, and ΔV13(gk)=V1(gk)−V3(gk); when the grayscale gk is smaller than a predetermined grayscale gs, a voltage V1(gk) and a voltage V3(gk) are applied, such that ΔV13(gk)>0V is set, and the relation ΔV12(gk)>ΔV13(gk) is satisfied; and when the grayscale gk is equal to or greater than the predetermined grayscale gs, $V1(gk)=V3(gk)$ is set such that $\Delta V13(gk)=0V$, and the relation $\Delta V12(gk)=\Delta V13(gk)$ is satisfied.

Preferably, the liquid crystal display device driving method further includes the following step: the first source line and the second source line provide a voltage signal to the first sub-pixel and the second sub-pixel each separately, and the gate line provides the same scan signal to the first sub-pixel and the second sub-pixel.

Preferably, when the voltage $V1(gk)$ is smaller than predetermined voltage Vs, a voltage $V1(gk)$ and a voltage $V2(gk)$ are applied, such that $\Delta V12(gk)>0V$, and the relation $\Delta V12(gk)>\Delta V12(gk+1)$ is satisfied; when the voltage $V1(gk)$ is equal to or greater than the predetermined voltage Vs, $V1(gk)=V2(gk)$ is set, such that $\Delta V12(gk)=0V$, and the relation $\Delta V12(gk)=\Delta V12(gk+1)$ is satisfied.

Preferably, the highest-brightness grayscale n is 256, and the predetermined grayscale gs is 128.

Preferably, the pixels are array pixels.

In a preferred embodiment of the present invention, a liquid crystal display device driving method is disclosed, and the liquid crystal display device includes a liquid crystal layer which is divided into a plurality of pixels. Each pixel includes a first sub-pixel and a second sub-pixel, and the pixels have a plurality of electrodes applying a voltage to the liquid crystal layer. The liquid crystal display device driving method includes the following steps: when each of the pixels displays a grayscale gk, a voltage $V1(gk)$ is applied to the first sub-pixel and a voltage $V2(gk)$ is applied to the second sub-pixel, $\Delta V12\ (gk)=V1\ (gk)-V2\ (gk)$ is set, wherein $0\leq gk\leq n$, and gk and n are integers greater than 0, and n stands for the highest-brightness grayscale; when the grayscale gk is smaller than a predetermined grayscale gs, the voltage $V1(gk)$ and voltage $V2(gk)$ are applied, such that $\Delta V12(gk)>0V$, and the relation $\Delta V12(gk)=\Delta V12(gk+1)$ is satisfied; and when the grayscale gk is equal to or greater than the predetermined grayscale gs, $V1(gk)=V2(gk)$ is set, such that $\Delta V12(gk)=0V$, and the relation $\Delta V12(gk)=\Delta V12(gk+1)$ is satisfied.

Preferably, the liquid crystal display device driving method further includes the following step: a voltage $V3(gk)$ is applied to the liquid crystal layer of a third sub-pixel which is different from the first sub-pixel and the second sub-pixel, and $\Delta V13(gk)=V1(gk)-V3(gk)$ is set; when the grayscale gk is smaller than the predetermined grayscale gs, a voltage $V1(gk)$ and a voltage $V3(gk)$ are applied, such that $\Delta V13(gk)>0V$, and the relation $\Delta V12(gk)>\Delta V13(gk)$ is satisfied; and when the grayscale gk is equal to or greater than the predetermined grayscale gs, $V1(gk)=V3(gk)$ is set, such that $\Delta V13(gk)=0V$, and the relation $\Delta V12(gk)=\Delta V13(gk)$ is satisfied.

Preferably, the liquid crystal display device driving method further includes the following steps: a first source line and a second source line provide a voltage signal to the first sub-pixel and the second sub-pixel each separately, and the gate line provides the same scan signal to the first sub-pixel and the second sub-pixel.

Preferably, when the voltage $V1(gk)$ is smaller than the predetermined voltage Vs, the voltage $V1(gk)$ and voltage $V2(gk)$ are applied, such that $\Delta V12(gk)>0V$, and the relation $\Delta V12(gk)=\Delta V12(gk+1)$ is satisfied; when the voltage $V1(gk)$ is equal to or greater than the predetermined voltage Vs, $V1(gk)=V2(gk)$ is set, such that $\Delta V12(gk)=0V$, and the relation $\Delta V12(gk)=\Delta V12(gk+1)$ is satisfied.

Preferably, the highest-brightness grayscale n is 256, and the predetermined grayscale gs is 128.

In a preferred embodiment of the present invention, a liquid crystal display device driving method is disclosed, and the liquid crystal display device includes a liquid crystal layer which is divided into a plurality of pixels. Each pixel includes a first sub-pixel and a second sub-pixel, and the pixels have a plurality of electrodes applying a voltage to the liquid crystal layer; and the liquid crystal display device driving method includes the following steps: when each of the pixels displays a grayscale gk, a voltage $V1(gk)$ is applied to the first sub-pixel and a voltage $V2(gk)$ is applied to the second sub-pixel, and $\Delta V12\ (gk)=V1\ (gk)-V2\ (gk)$ is set, wherein $0\leq gk\leq n$, and gk and n are integers greater than 0, and n stands for the highest-brightness grayscale; when the grayscale gk is smaller than a predetermined grayscale gs, the voltage $V1(gk)$ and the voltage $V2(gk)$ are applied, such that $\Delta V12(gk)>0V$, and the relation $\Delta V12(gk)\geq\Delta V12(gk+1)$ is satisfied; and when the grayscale gk is equal to or greater than the predetermined grayscale gs, $V1(gk)=V2(gk)$ is set, such that $\Delta V12(gk)=0V$, and the relation $\Delta V12(gk)=\Delta V12(gk+1)$ is satisfied.

Preferably, the liquid crystal display device driving method further includes the following step: a voltage $V3(gk)$ is applied to a liquid crystal layer of a third sub-pixel which is different from the first sub-pixel and the second sub-pixel, $\Delta V13(gk)=V1(gk)-V3(gk)$ is set; when the grayscale gk is smaller than a predetermined grayscale gs, the voltage $V1(gk)$ and voltage $V3(gk)$ are applied, such that $\Delta V13(gk)>0V$, and the relation $\Delta V12(gk)>\Delta V13(gk)$ is satisfied; and when the grayscale gk is equal to or greater than the predetermined grayscale gs, $V1(gk)=V3(gk)$ is set, such that $\Delta V13(gk)=0V$, and the relation $\Delta V12(gk)=\Delta V13(gk)$ is satisfied.

Preferably, the liquid crystal display device driving method further includes the following step: a first source line and a second source line provide a voltage signal to the first sub-pixel and the second sub-pixel separately; and a gate line provides the same scan signal to the first sub-pixel and the second sub-pixel.

Preferably, when the voltage $V1(gk)$ is smaller than the predetermined voltage Vs, the voltage $V1(gk)$ and voltage $V2(gk)$ are applied, such that $\Delta V12(gk)>0V$, and the relation $\Delta V12(gk)\geq\Delta V12(gk+1)$ is satisfied; when the voltage $V1(gk)$ is equal to or greater than the predetermined voltage Vs, $V1(gk)=V2(gk)$ is set, such that $\Delta V12(gk)=0V$, and the relation $\Delta V12(gk)=\Delta V12(gk+1)$ is satisfied.

Preferably, the highest-brightness grayscale n is 256, and the predetermined grayscale gs is 128.

In summation, the present invention provides a liquid crystal display device and its driving method. Wherein, a voltage is applied to the sub-pixels separately to improve the γ characteristic of different viewing angles of the liquid crystal display device and the display quality. In addition, the present invention provides different conditions for applying the voltage when displaying different grayscales, so as to improve the driving process and the drive efficiency of the liquid crystal display device.

BRIEF DESCRIPTION OF THE DRAWINGS

The above and other objects, features and advantages of this disclosure will become apparent from the following detailed description taken with the accompanying drawings. It is noteworthy that the drawings are provided for the purpose of illustrating the invention and other drawings may be obtained without any creative labor by persons having ordinary skill in the art.

DESCRIPTION OF THE PREFERRED EMBODIMENTS

It is noteworthy that the embodiments are provided for the purpose of illustrating the present invention, but not intended for limiting the scope of the invention.

It is noteworthy that this specification uses an open-ended term "including" meaning that the claim encompasses all the elements listed, but may also include additional unnamed elements.

Figure 1:
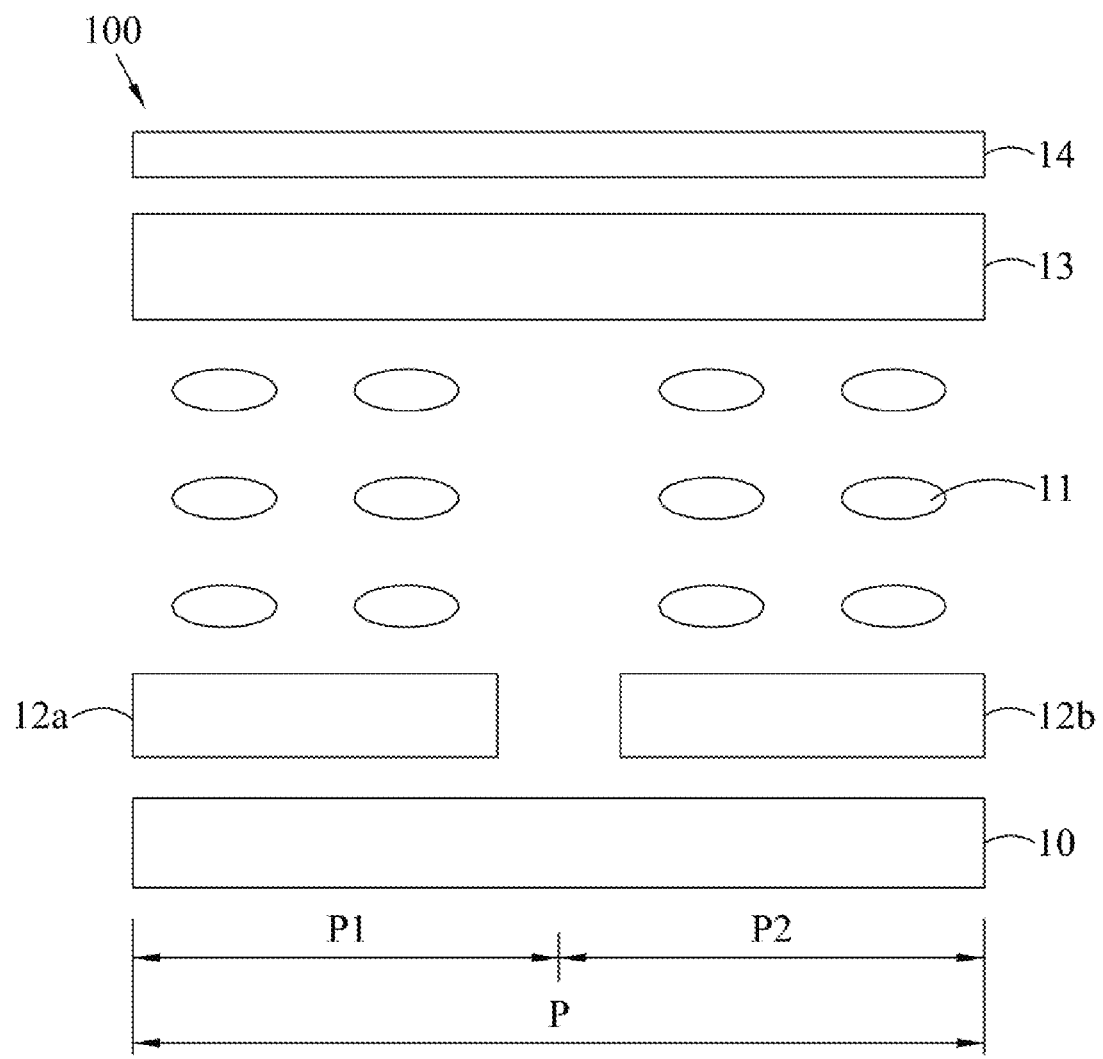
FIG. 1 is a schematic view of a liquid crystal display device in accordance with a preferred embodiment of the present invention.

With reference to FIG. 1 for a schematic view of a liquid crystal display device in accordance with a preferred embodiment of the present invention, the liquid crystal display device 100 includes a plurality of pixels P arranged in an array, and each pixel P has a liquid crystal layer 11 disposed on a substrate 10, wherein the liquid crystal display device 100 displays in a normal-black manner. The liquid crystal layer 11 forms an electric field, by a pixel electrode and a common electrode 13 to change the twisted direction of liquid crystal molecules, so as to change the transmittance of the liquid crystal display device 100. Wherein, the pixel electrode includes a first electrode 12a and a second electrode 12b installed between the substrate 10 and the liquid crystal layer 11, and the first electrode 12a and common electrode 13 apply a voltage to a first sub-pixel P1 of the pixel P, and the second electrode 12b and common electrode 13 apply a voltage to a second sub-pixel P2 of the pixel P. Since the first electrode 12a and second electrode 12b can apply different voltages, therefore the liquid crystal of different sub-pixels in each pixel P can be controlled to have different levels of twisting. For different viewing angles, the γ characteristic of the liquid crystal display device 100 can be improved.

Figure 2:
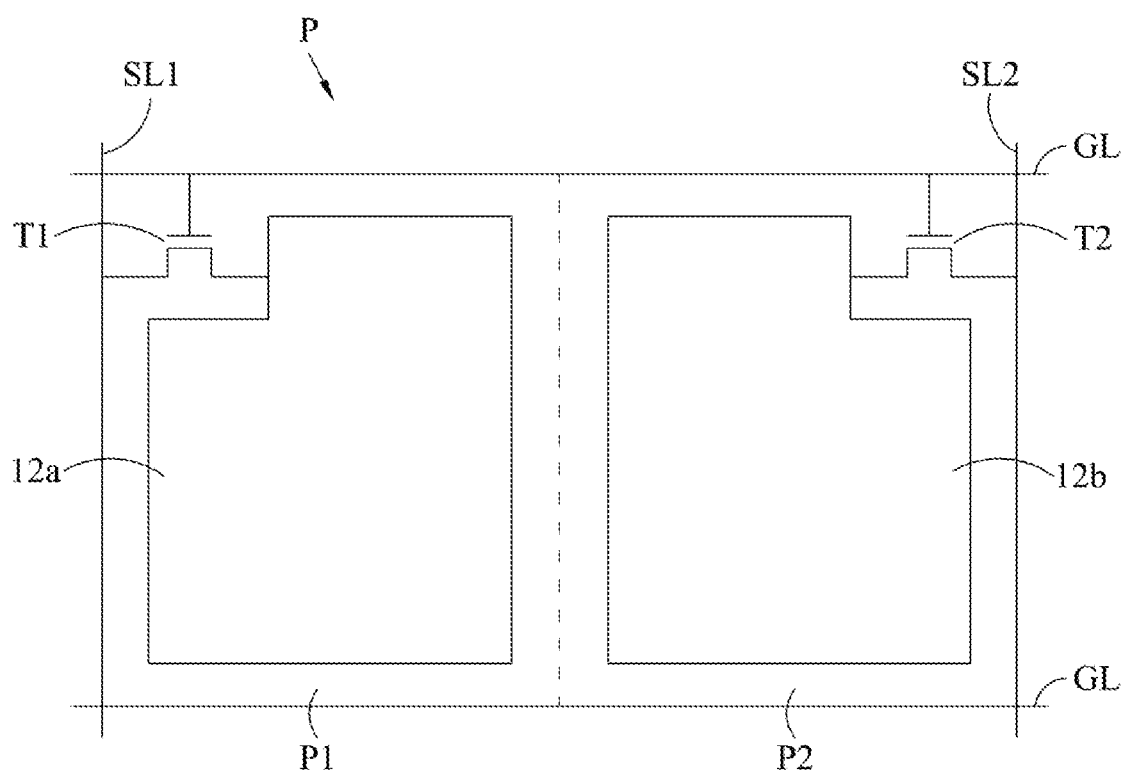
FIG. 2 is a schematic view showing a type of pixels of a liquid crystal display device in accordance with a preferred embodiment of the present invention.

With reference to FIG. 2 for a schematic view showing a pixel of a liquid crystal display device in accordance with a preferred embodiment of the present invention, the liquid crystal display device uses a parallel gate line and a parallel source line to form a plurality of array pixels P, and the area of each pixel P may be divided into a first sub-pixel P1 and a second sub-pixel P2. Wherein, the first sub-pixel P1 includes a first electrode 12a and a first transistor T1, and the first electrode 12a is electrically coupled to a first source line SL1 through the first transistor T1, and the second sub-pixel P2 includes a second electrode 12b and a second transistor T2, and the second electrode 12b is electrically coupled to a second source line SL2 through the second transistor T2, and the first source line SL1 and the second source line SL2 are parallel to each other and provide a voltage signal to the first sub-pixel P1 and second sub-pixel P2 separately. In addition, the first transistor T1 and the second transistor T2 are electrically coupled to a same gate line GL, and the gate line GL provides a same scan signal to the first sub-pixel P1 and the second sub-pixel P2. When each pixel P needs to display a specific grayscale, a control chip of the gate line and source line is connected to send a same scan signal to the pixel P through the gate line GL, and the respective voltage signals by the first source line SL1 and the second source line SL2 respectively, so that the first electrode 12a and the second electrode 12b can apply different voltages to the liquid crystal layers of the pixels respectively.

Figure 3A:
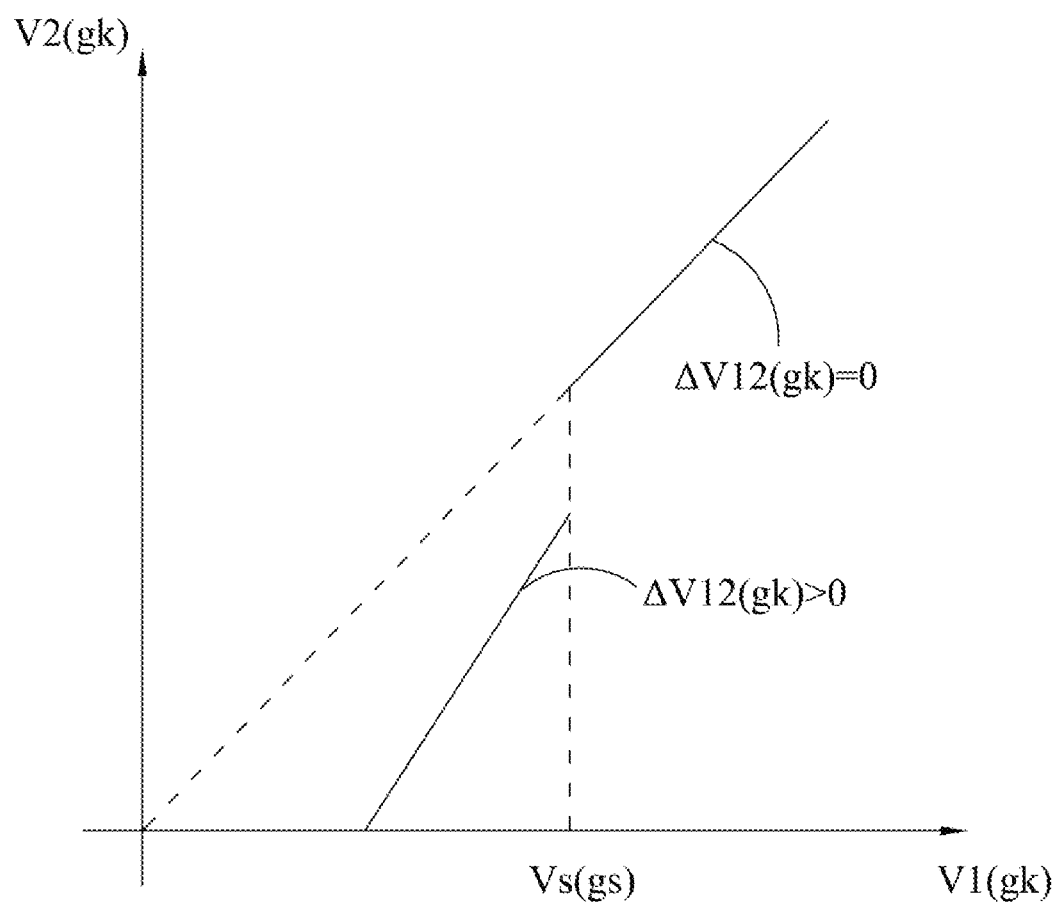
FIGS. 3A and 3B are schematic views showing a status of applying a voltage in accordance with a preferred embodiment of the present invention.
Figure 3B:
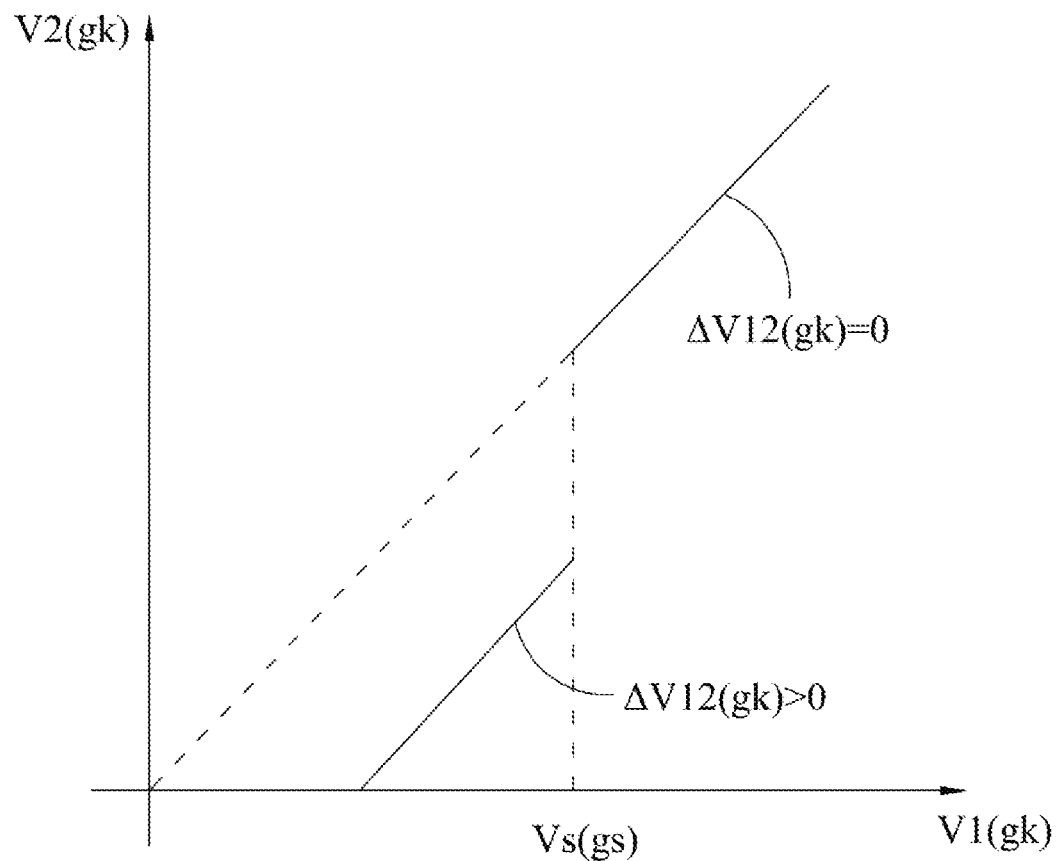

With reference to FIGS. 3A and 3B for the schematic views showing a status of applying a voltage in accordance with a preferred embodiment of the present invention, FIG. 3A shows that the horizontal axis represents the first voltage V1(gk) applied to the first pixel, and the vertical axis represents the second voltage V2(gk) applied to the second pixel, and a voltage difference ΔV12 (gk)=V1 (gk)−V2 (gk) is set, wherein 0≤gk≤n, and gk and n are integers greater than 0, and gk is the grayscale of the pixel displayed by the liquid crystal display device, and n stands for the highest-brightness grayscale. For example, n is 256. The status of applying the first voltage V1(gk) and second voltage V2(gk) is shown in the figure. When the grayscale gk is smaller than a predetermined grayscale gs, ΔV12(gk)>0V is set, and the relation ΔV12(gk)>ΔV12(gk+1) is satisfied. In other words, when the grayscale gk is between 0 and gs, the first voltage V1(gk) is greater than second voltage V2(gk). When the grayscale gk is increased, the voltage difference ΔV12(gk) between the first voltage V1(gk) and the second voltage V2(gk) drops gradually. When the grayscale gk is equal to or greater than the predetermined grayscale gs, ΔV12(gk)=0V is set, and the relation ΔV12(gk)=ΔV12(gk+1) is satisfied. In other words, when the grayscale gk is between gs and n, the first voltage V1(gk) is controlled to be equal to the second voltage V2(gk), so that the voltage difference ΔV12 (gk) between the first voltage V1(gk) and the second voltage V2(gk) is 0. When the grayscale gk is increased, the voltage difference ΔV12(gk) between the first voltage V1(gk) and the second voltage V2(gk) remains unchanged.

In FIG. 3B, the horizontal axis represents the first voltage V1(gk) applied to the first pixel, and the vertical axis represents the second voltage V2(gk) applied to the second pixel, and a voltage difference ΔV12 (gk)=V1 (gk)−V2 (gk) is set, wherein 0≤gk≤n, and gk and n are integers greater than 0, and gk is the grayscale of the pixel displayed by the liquid crystal display device, and n stands for the highest-brightness grayscale. For example, n is 256. The status of applying the first voltage V1(gk) and second voltage V2(gk) is shown in the figure. When the grayscale gk is smaller than a predetermined grayscale gs, ΔV12(gk)>0V is set, and the relation ΔV12(gk)=ΔV12(gk+1) is satisfied. In other words, when the grayscale gk is between 0 and gs, the first voltage V1(gk) is greater than second voltage V2(gk). When the grayscale gk is increased, the voltage difference ΔV12(gk) between the first voltage V1(gk) and the second voltage V2(gk) remains unchanged. When the grayscale gk is equal to or greater than the predetermined grayscale gs, ΔV12(gk)=0V is set, and the relation ΔV12(gk)=ΔV12(gk+1) is satisfied. In other words, when the grayscale gk is between gs and n, the first voltage V1(gk) is controlled to be equal to the second voltage V2(gk), so that the voltage difference ΔV12(gk) between the first voltage V1(gk) and the second voltage V2(gk) is 0. When the grayscale gk is increased, the voltage difference ΔV12(gk) between the first voltage V1(gk) and the second voltage V2(gk) remains unchanged.

Since the transmittance of the liquid crystal display device increases with the voltage, therefore the predetermined grayscale gs can be determined by its corresponding applied voltage. For example, if the applied first voltage V1(gk) reaches a voltage value Vs(gs) of the predetermined grayscale gs, then the status of applying a voltage as shown in FIGS. 3A and 3B may be used to control the liquid crystal display device. The first voltage applied to the first sub-pixel and the second voltage applied to the second sub-pixel can be controlled, so that when the grayscale is low, an appropriate voltage difference is provided to improve the γ characteristic of different viewing angles of the liquid crystal display device. When the displayed grayscale reaches the predetermined grayscale (such as when the predetermined grayscale gs is greater than 128), the voltage applied to the first sub-pixel and the voltage applied to the second sub-pixel are equal, so that the use of the control program for switching different voltage signals can be reduced to improve the drive efficiency of the liquid crystal display device.

Figure 4:
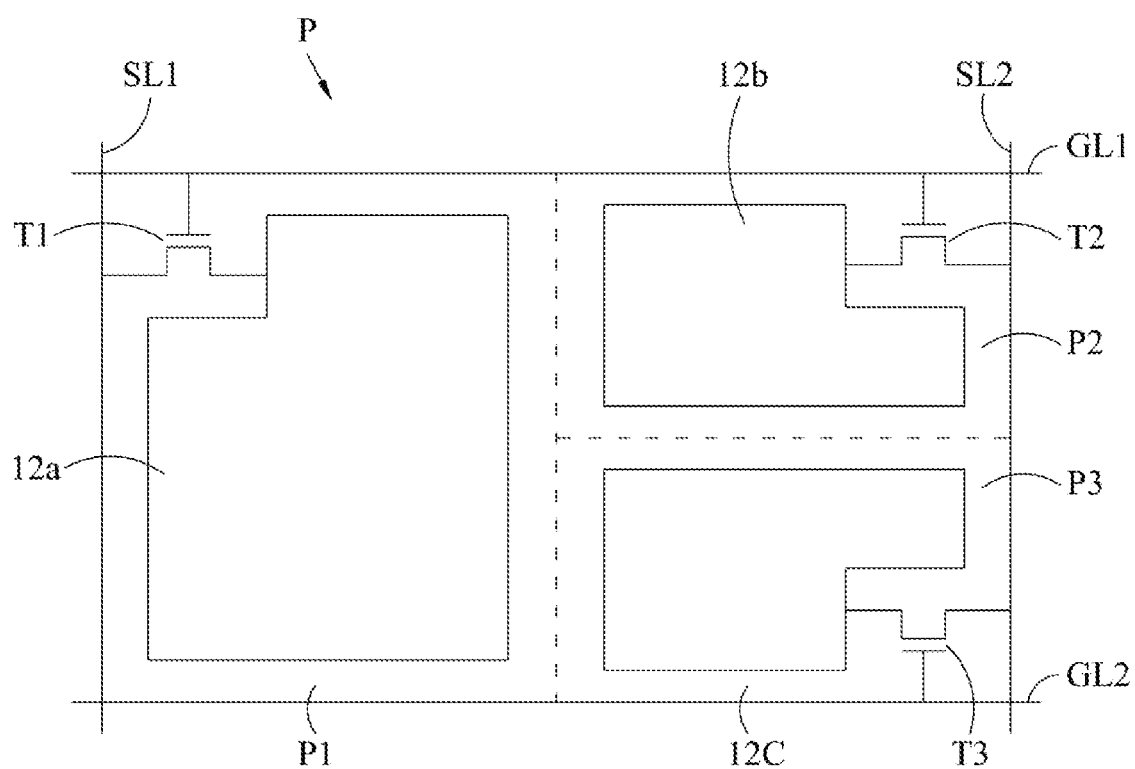
FIG. 4 is a schematic view showing another type of pixels of a liquid crystal display device in accordance with a preferred embodiment of the present invention.

With reference to FIG. 4 for a schematic view showing another type of pixels of a liquid crystal display device in accordance with a preferred embodiment of the present invention, the liquid crystal display device uses a parallel gate line and a parallel source line to form a plurality of array pixels P, and the area of each pixel P may be divided into a first sub-pixel P1, a second sub-pixel P2, and a third sub-pixel P3. Wherein, the first sub-pixel P1 includes a first electrode 12a and a first transistor T1, and the first electrode 12a is electrically coupled to a first source line SL1 through the first transistor T1, and the second sub-pixel P2 includes a second electrode 12b and a second transistor T2, and the second electrode 12b is electrically coupled to a second source line SL2 through the second transistor T2, and the third sub-pixel P3 includes a third electrode 12c and a third transistor T3, and the third electrode 12c is electrically coupled to the second source line SL2 through a third transistor T3, and the first source line SL1 and the second source line SL2 are parallel to each other, and the first source line SL1 provides a voltage signal to the first sub-pixel P1, and the second source line SL2 provides a voltage signal to the second sub-pixel P2. In addition, the first transistor T1 and the second transistor T2 are electrically coupled to a first gate line GL1, and the first gate line GL1 provides a same scan signal to the first sub-pixel P1 and the second sub-pixel P2, and the third transistor T3 is electrically coupled to the second gate line GL2, and the second gate line GL2 provides a scan signal to the third sub-pixel P3. When each pixel P needs to display a specific grayscale, a control chip of the gate line and the source line is connected to send a scan signal to the pixel P through the first gate line GL1 and the second gate line GL2, and also send a voltage signal to the first source line SL1 and the second source line SL2 separately, so that the first electrode 12a, second electrode 12b and third electrode 12c can apply different voltages to the liquid crystal layers of the pixels respectively.

In the foregoing preferred embodiment, the pixel is divided into three sub-pixels, wherein the voltage applied to the third sub-pixel P3 is V3(gk), and the voltage difference ΔV13(gk)=V1(gk)−V3(gk) between the first sub-pixel P1 and the third sub-pixel is set. Wherein, when the grayscale gk is smaller than a predetermined grayscale gs, ΔV13(gk)>0V is set, and the relation ΔV12(gk)>ΔV13(gk) is satisfied. In other words, when the grayscale gk is between 0 and gs, the first voltage V1(gk) is greater than the third voltage V2(gk). In the meantime, the voltage difference ΔV12(gk) between the first voltage V1(gk) and the second voltage V2(gk) is greater than the voltage difference ΔV13(gk) between the first sub-pixel P1 and the third sub-pixel. When the grayscale gk is equal to or greater than the predetermined grayscale gs, ΔV13(gk)=0V is set, and the relation ΔV12(gk)=ΔV13(gk) is satisfied. In other words, when the grayscale gk is between gs and n, the first voltage V1(gk) is controlled to be equal to the third voltage V3(gk), such that ΔV13(gk)=0. When the grayscale gk is increased, the voltage difference between the ΔV12(gk) and the ΔV13(gk) is 0. The aforementioned way of dividing the pixel into sub-pixels can divide the second sub-pixel P2 and the third sub-pixel P3 with the same area, but the present invention is not limited to such arrangement only, and each pixel may be divided into three or more sub-pixels, and the area occupied by each sub-pixel may be designed according to the quantity of divisions. The more the divided sub-pixels, the more the control circuits, in order to provide different voltages. Therefore, appropriate quantity and positions of the divided sub-pixels can be used for the divided sub-pixels to meet the required display quality of the liquid crystal display device.

Figure 5:
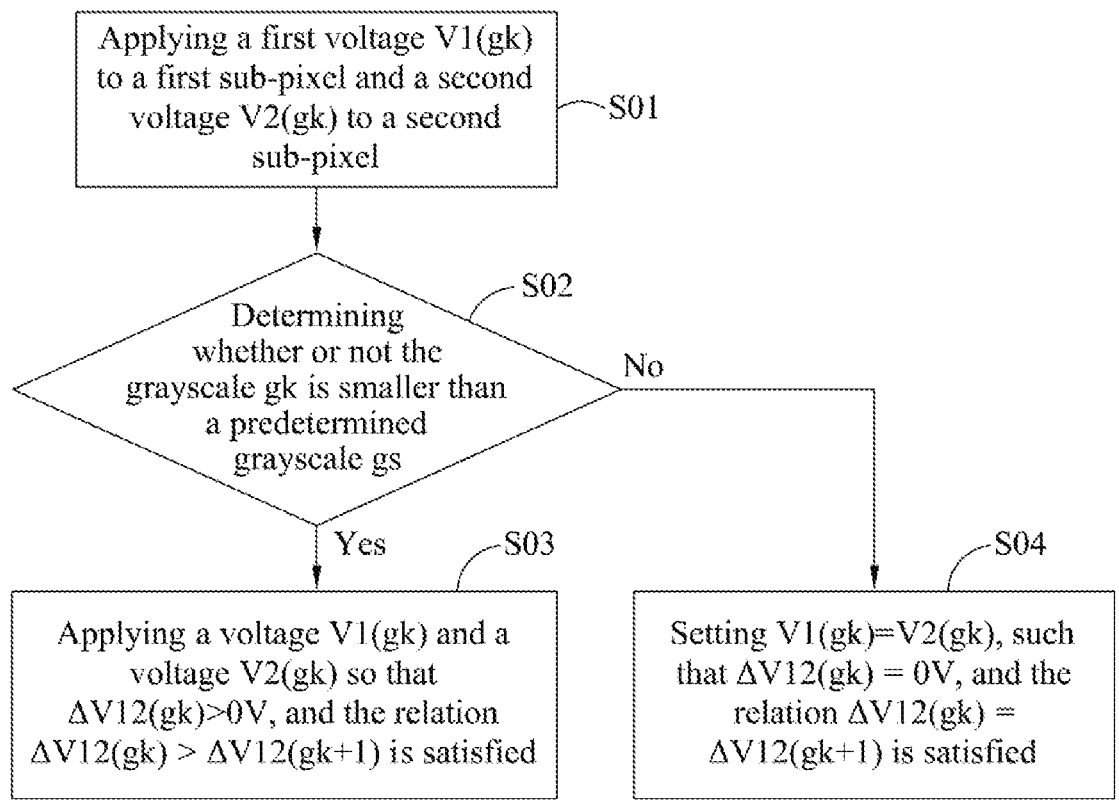
FIG. 5 is a flow chart of a liquid crystal display device driving method in accordance with a preferred embodiment of the present invention.

With reference to FIG. 5 a flow chart of a liquid crystal display device driving method in accordance with a preferred embodiment of the present invention, the liquid crystal display device driving method is applicable for the liquid crystal display device as shown in FIGS. 1 and 2, and the liquid crystal display device includes a liquid crystal layer 11, and each pixel P includes a first sub-pixel P1 and a second sub-pixel P2, and a first source line SL1 and a second source line SL2 provide a voltage signal to the first sub-pixel P1 and the second sub-pixel P2 separately, and a same scan signal is provided to the first sub-pixel P1 and the second sub-pixel P2 through the gate line GL, and a voltage is applied to the first pixel P1 on the liquid crystal layer 11 through the first electrode 12a and a voltage is applied to the second pixel P2 on the liquid crystal layer 11 through the second electrode 12b. The liquid crystal display device driving method includes the following steps (S01-S04):

Step S01: Applying a first voltage V1(gk) to a first sub-pixel and a second voltage V2(gk) to a second sub-pixel.

Step S02: Determining whether or not the grayscale gk is smaller than a predetermined grayscale gs. Like the previous preferred embodiment, Step S02 determines whether or not the grayscale is smaller than the predetermined grayscale gs or making the determination by comparing if the applied first voltage V1(gk) has reached a voltage value Vs(gs) of the predetermined grayscale gs.

If yes, go to Step S03: Applying a voltage V1(gk) and a voltage V2(gk) so that ΔV12(gk)>0V, and the relation ΔV12(gk)>ΔV12(gk+1) is satisfied.

If no, go to Step S04: Setting V1(gk)=V2(gk), such that ΔV12(gk)=0V, and the relation ΔV12(gk)=ΔV12(gk+1) is satisfied.

The aforementioned step may be executed according to the voltage control status as shown in FIG. 3A. If so, Step S03 satisfies the relation ΔV12(gk)=ΔV12(gk+1). In addition, if the pixel is divided into three or more sub-pixels, the voltage control as described in Steps S03 and S04 has to add the voltage control of the third sub-pixel. For example, Step S03 further applies a third voltage V3(gk) to the third sub-pixel in addition to applying the first voltage V1(gk) and second voltage V2(gk) to the first sub-pixel and the second sub-pixel respectively, and $\Delta V13(gk)>0V$, and the relation $\Delta V12(gk)>\Delta V13(gk)$ is satisfied. In Step S04, V1(gk)=V3 (gk) is set, so that $\Delta V13(gk)=0V$, and the relation $\Delta V12(gk)=\Delta V13(gk)$ is satisfied.

Figure 6A:
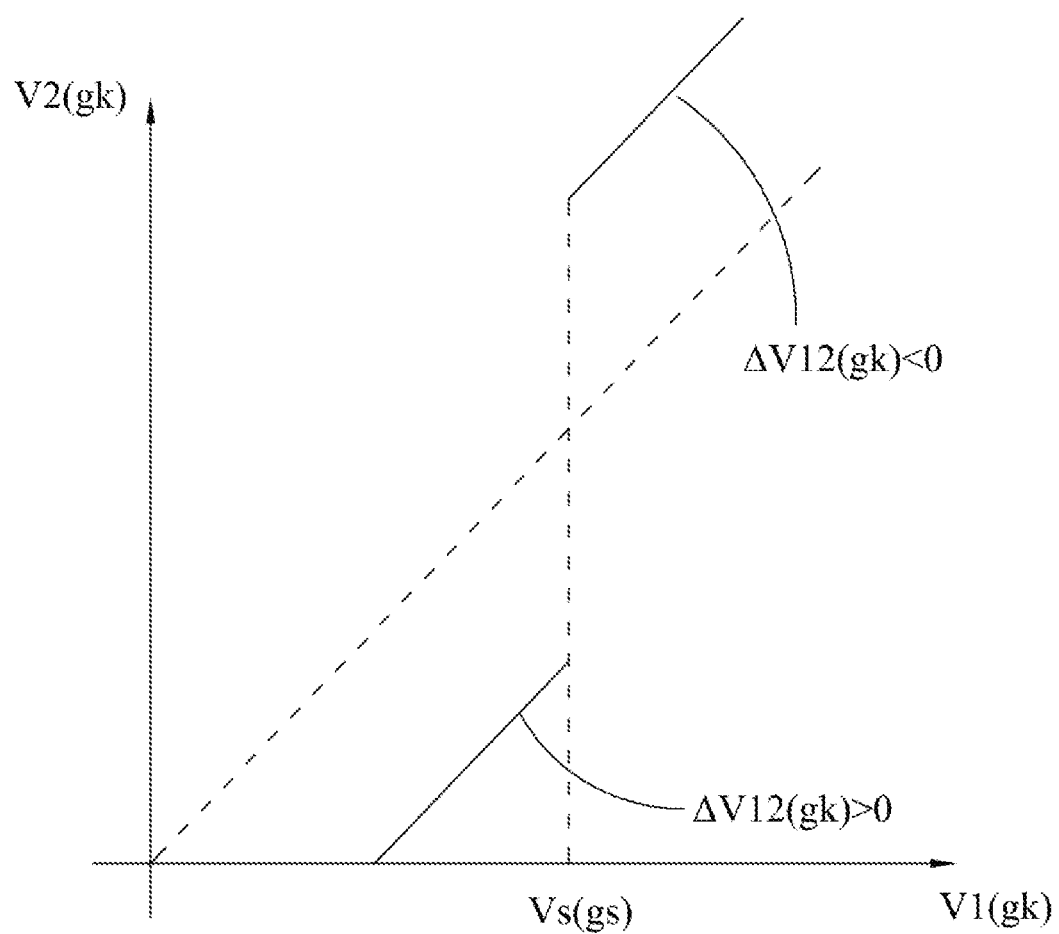
FIGS. 6A and 6B are schematic views showing another status of applying a voltage in accordance with a preferred embodiment of the present invention.
Figure 6B:
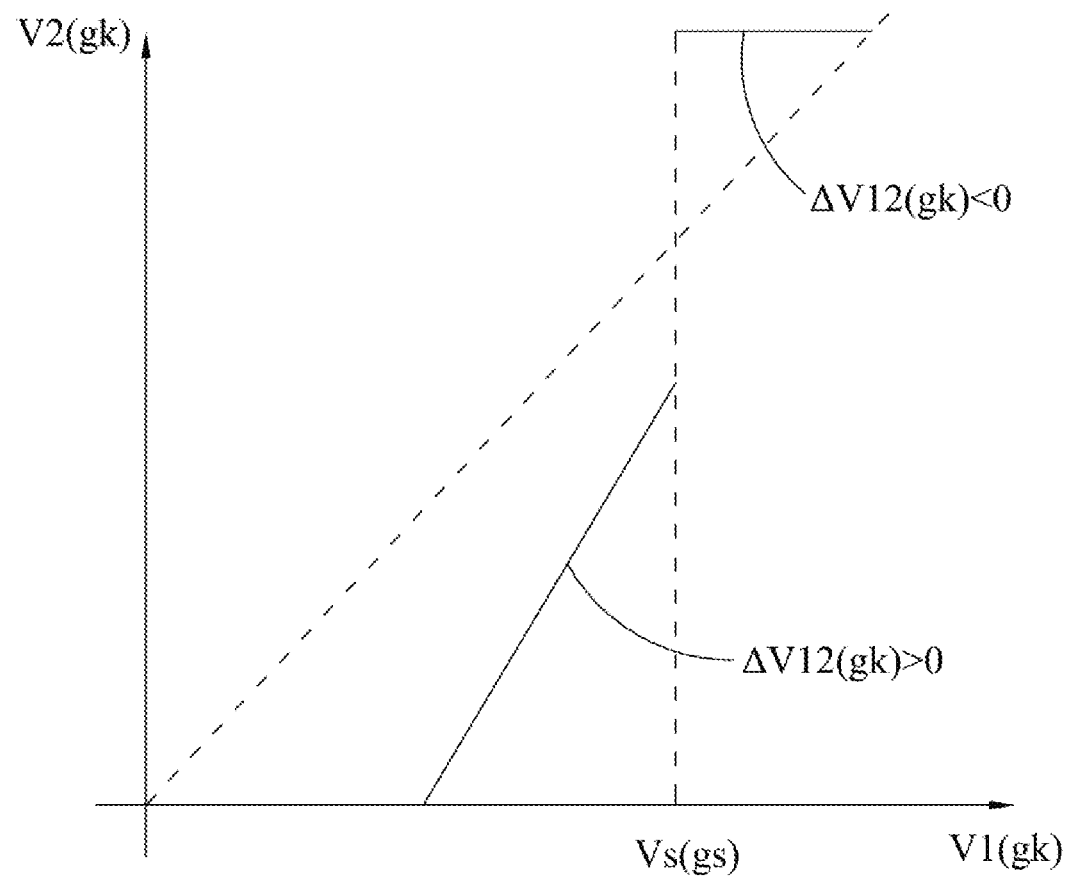

With reference to FIGS. 6A and 6B for the schematic views showing another status of applying a voltage in accordance with a preferred embodiment of the present invention, FIG. 6A shows that the horizontal axis represents the first voltage V1(gk) applied to the first pixel, and the vertical axis represents the second voltage V2(gk) applied to the second pixel, and a voltage difference $\Delta V12(gk)=V1(gk)-V2(gk)$ is set, wherein $0 \leq gk \leq n$, and gk and n are integers greater than 0, and gk is the grayscale of the pixel displayed by the liquid crystal display device, and n stands for the highest-brightness grayscale. For example, n is 256. The status of applying the first voltage V1(gk) and second voltage V2(gk) is shown in the figure. When the grayscale gk is smaller than a predetermined grayscale gs, $\Delta V12(gk)>0V$ is set, and the relation $\Delta V12(gk)>\Delta V12(gk+1)$ is satisfied. In other words, when the grayscale gk is between 0 and gs, the first voltage V1(gk) is greater than second voltage V2(gk). When the grayscale gk is increased, the voltage difference $\Delta V12(gk)$ between the first voltage V1(gk) and the second voltage V2(gk) drops gradually. When the grayscale gk is equal to or greater than the predetermined grayscale gs, $\Delta V12(gk)<0V$ is set, and the relation $\Delta V12(gk) \leq \Delta V12(gk+1)$ is satisfied. In other words, when the grayscale gk is between gs and n, the first voltage V1(gk) is controlled to be smaller than the second voltage V2(gk), so that the voltage difference $\Delta V12(gk)$ between the first voltage V1(gk) and the second voltage V2(gk) smaller than 0. When the grayscale gk is increased, the voltage difference $\Delta V12(gk)$ between the first voltage V1(gk) and the second voltage V2(gk) increases gradually.

In FIG. 6B, the horizontal axis represents the first voltage V1(gk) applied to the first pixel, and the vertical axis represents the second voltage V2(gk) applied to the second pixel, and a voltage difference $\Delta V12(gk)=V1(gk)-V2(gk)$ is set, wherein $0 \leq gk \leq n$, and gk and n are integers greater than 0, and gk is the grayscale of the pixel displayed by the liquid crystal display device, and n stands for the highest-brightness grayscale. For example, n is 256. The status of applying the first voltage V1(gk) and second voltage V2(gk) is shown in the figure. When the grayscale gk is smaller than a predetermined grayscale gs, $\Delta V12(gk)>0V$ is set, and the relation $\Delta V12(gk)=\Delta V12(gk+1)$ is satisfied. In other words, when the grayscale gk is between 0 and gs, the first voltage V1(gk) is greater than second voltage V2(gk). When the grayscale gk is increased, the voltage difference $\Delta V12(gk)$ between the first voltage V1(gk) and the second voltage V2(gk) remain unchanged. When the grayscale gk is equal to or greater than the predetermined grayscale gs, $\Delta V12(gk)<0V$ is set, and the relation $\Delta V12(gk)=\Delta V12(gk+1)$ is satisfied. In other words, when the grayscale gk is between gs and n, the first voltage V1(gk) is controlled to be smaller than the second voltage V2(gk), so that the voltage difference $\Delta V12(gk)$ between the first voltage V1(gk) and the second voltage V2(gk) is smaller than 0. When the grayscale gk is increased, the voltage difference $\Delta V12(gk)$ between the first voltage V1(gk) and the second voltage V2(gk) remains unchanged.

Since the transmittance of the liquid crystal display device increases with the voltage, therefore the predetermined grayscale gs can be determined by its corresponding applied voltage. For example, if the applied first voltage V1(gk) reaches a voltage value Vs(gs) of the predetermined grayscale gs, then the status of applying a voltage as shown in FIGS. 6A and 6B may be used to control the liquid crystal display device. With the aforementioned method, the first voltage applied to the first sub-pixel and the second voltage applied to the second sub-pixel can be controlled, so that when the grayscale is low, an appropriate voltage difference is provided to improve the γ characteristic of different viewing angles of the liquid crystal display device. When the displayed grayscale reaches the predetermined grayscale (such as when the predetermined grayscale gs is greater than 128), the voltage applied to the first sub-pixel is smaller than or equal to the voltage applied to the second sub-pixel. By changing the status of applying the voltage, the display effect of the liquid crystal display device can be improved.

If the pixel of the liquid crystal display device is divided into three sub-pixels as shown in FIG. 4, a third voltage is applied to the third sub-pixel in addition to applying the first voltage V1(gk) and second voltage V2(gk) to the first sub-pixel and the second sub-pixel respectively. When the grayscale gk is smaller than the predetermined grayscale gs, the relations $\Delta V13(gk)>0V$ and $\Delta V12(gk)>\Delta V13(gk)$ are satisfied. When the grayscale gk is equal to or greater than the predetermined grayscale gs, the relations $\Delta V13(gk)<0V$, and $\Delta V12(gk)=\Delta V13(gk)$ are satisfied.

Figure 7:
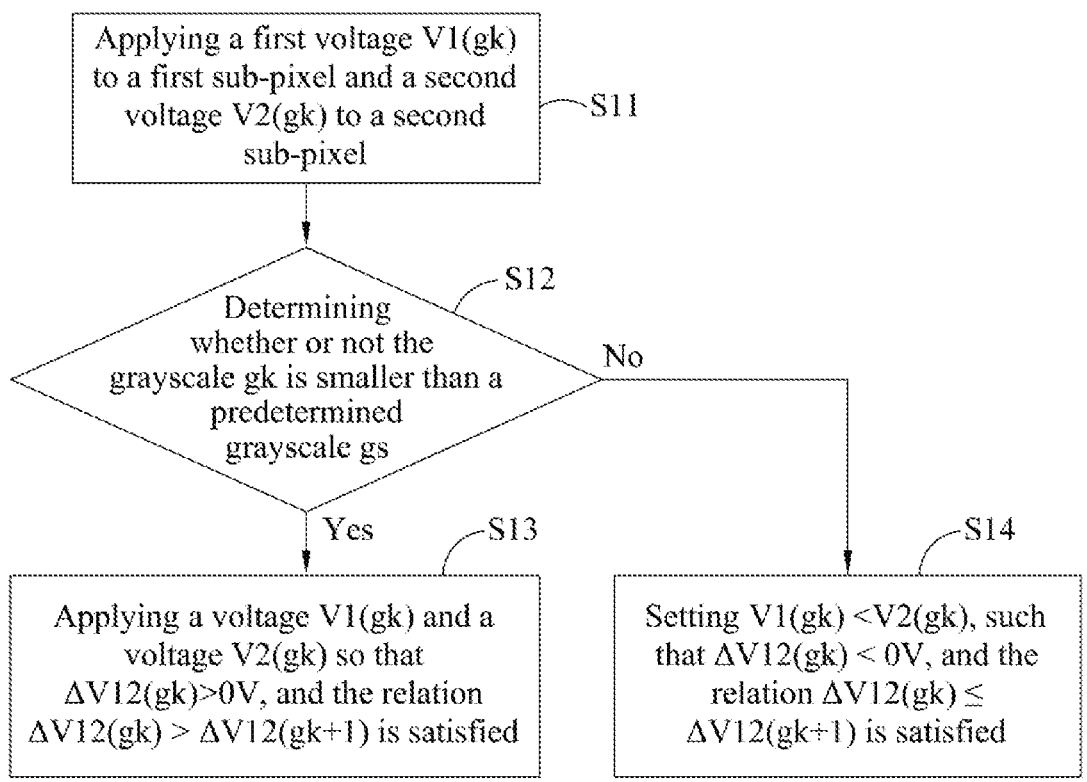
FIG. 7 is a flow chart of another liquid crystal display device driving method in accordance with a preferred embodiment of the present invention.

With reference to FIG. 7 for a flow chart of another liquid crystal display device driving method in accordance with a preferred embodiment of the present invention, the liquid crystal display device driving method is applicable for the liquid crystal display device as shown in FIGS. 1 and 2, and the liquid crystal display device includes a liquid crystal layer 11, and each pixel P includes a first sub-pixel P1 and a second sub-pixel P2, and a first source line SL1 and a second source line SL2 provide a voltage signal to the first sub-pixel P1 and the second sub-pixel P2 separately, and a same scan signal is provided to the first sub-pixel P1 and the second sub-pixel P2 through the gate line GL, and a voltage is applied to the first pixel P1 on the liquid crystal layer 11 through the first electrode 12a and a voltage is applied to the second pixel P2 on the liquid crystal layer 11 through the second electrode 12b. The liquid crystal display device driving method includes the following steps (S11-S14):

Step S11: Applying a first voltage V1(gk) to a first sub-pixel and a second voltage V2(gk) to a second sub-pixel.

Step S12: Determining whether or not the grayscale gk is smaller than a predetermined grayscale gs. Like the previous preferred embodiment, Step S12 determines whether or not the grayscale is smaller than the predetermined grayscale gs or making the determination by comparing if the applied first voltage V1(gk) has reached a voltage value Vs(gs) of the predetermined grayscale gs.

If yes, go to Step S13: Applying a voltage V1(gk) and a voltage V2(gk) so that $\Delta V12(gk)>0V$, and the relation $\Delta V12(gk)>\Delta V12(gk+1)$ is satisfied.

If no, go to Step S14: Setting V1(gk)<V2(gk), such that $\Delta V12(gk)<0V$, and the relation $\Delta V12(gk) \leq \Delta V12(gk+1)$ is satisfied.

The aforementioned step is executed by referring to the voltage control status as illustrated in FIG. 6A. If so, Step S13 satisfies the relation $\Delta V12(gk)=\Delta V12(gk+1)$ and Step S14 satisfies the relation $\Delta V12(gk)=\Delta V12(gk+1)$. If addition, if the pixel is divided into three or more sub-pixels, the voltage control as described in Steps S13 and S14 has to add the voltage control of the third sub-pixel. When the grayscale gk is smaller than the predetermined grayscale gs, the voltage V1(gk) and voltage V3(gk) are applied, and $\Delta V13$ (gk)>0V is set, and the relation ΔV12(gk)>ΔV13(gk) is satisfied. When the grayscale gk is equal to or greater than the predetermined grayscale gs, V1(gk)<V3(gk) is set, such that ΔV13(gk)<0V, and the relation ΔV12(gk)=ΔV13(gk) is satisfied.

Figure 8A:
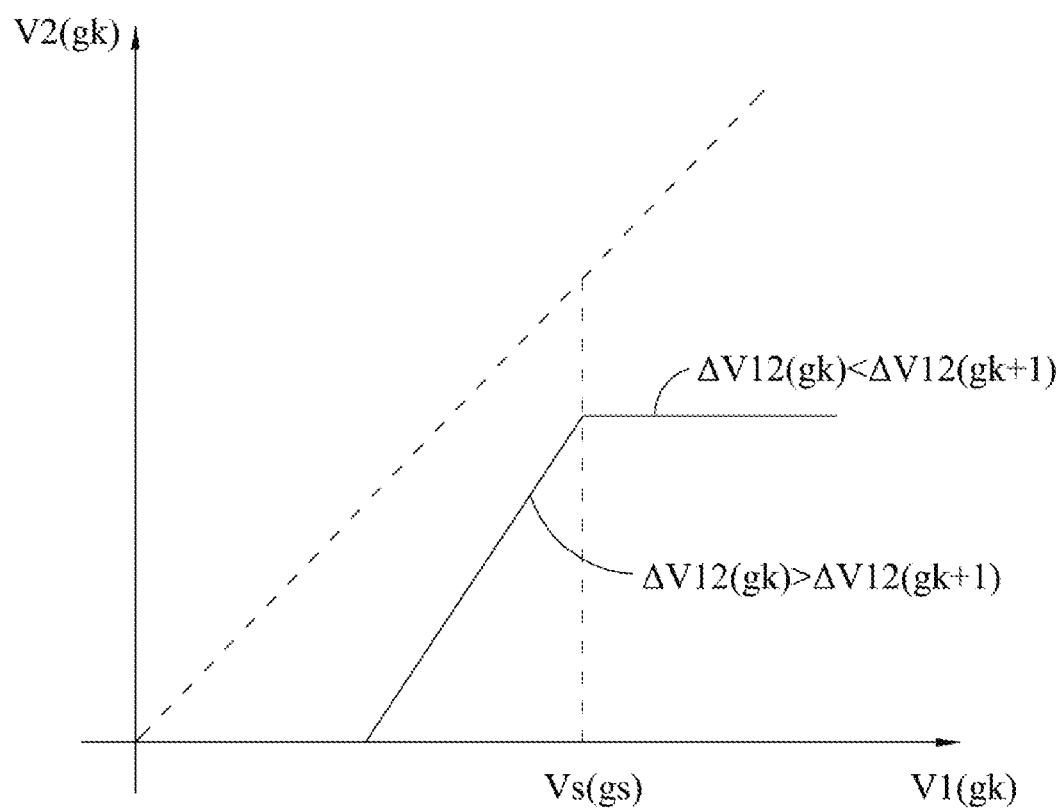
FIGS. 8A and 8B are schematic views showing a further status of applying a voltage in accordance with a preferred embodiment of the present invention.
Figure 8B:
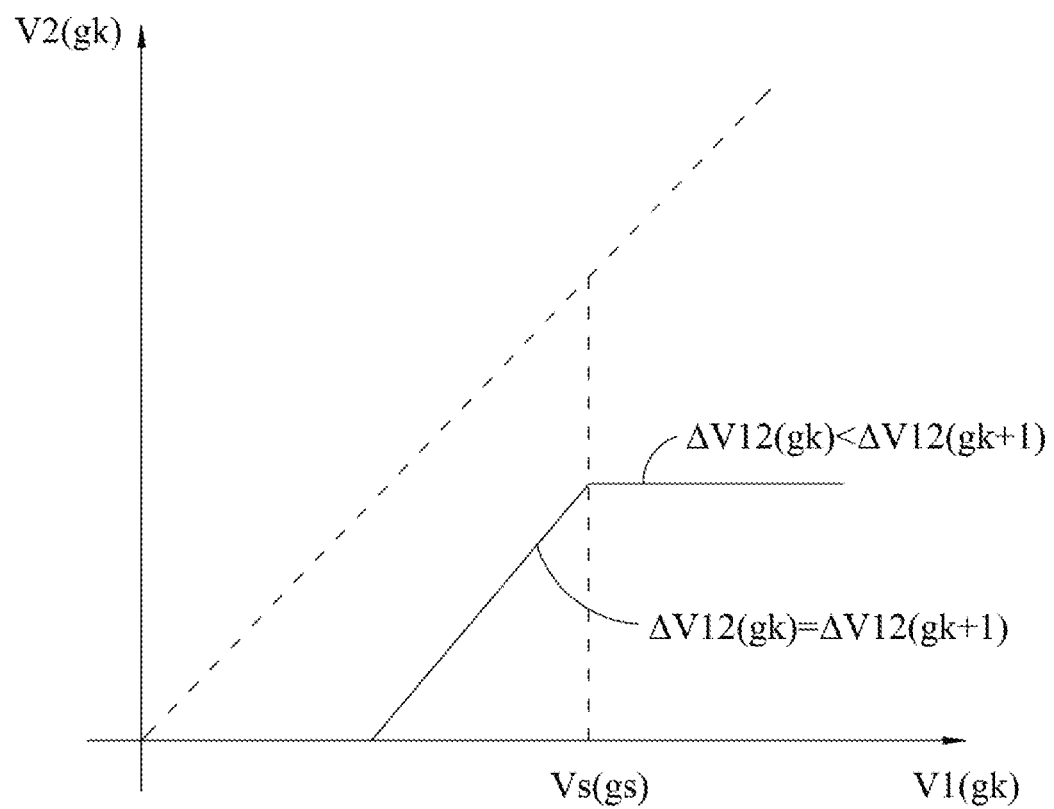

With reference to FIGS. 8A and 8B for the schematic views showing a further status of applying a voltage in accordance with a preferred embodiment of the present invention, FIG. 8A shows that the horizontal axis represents the first voltage V1(gk) applied to the first pixel, and the vertical axis represents the second voltage V2(gk) applied to the second pixel, and a voltage difference ΔV12 (gk)=V1 (gk)−V2 (gk) is set, wherein 0≤gk≤n, and gk and n are integers greater than 0, and gk is the grayscale of the pixel displayed by the liquid crystal display device, and n stands for the highest-brightness grayscale. For example, n is 256. The status of applying the first voltage V1(gk) and second voltage V2(gk) is shown in the figure. When the grayscale gk is smaller than predetermined grayscale gs, ΔV12(gk)>0V is set, and the relation ΔV12(gk)>ΔV12(gk+1) is satisfied. In other words, when the grayscale gk is between 0 and gs, the first voltage V1(gk) is greater than second voltage V2(gk). In the meantime, the grayscale gk is increased, the voltage difference ΔV12(gk) between the first voltage V1(gk) and the second voltage V2(gk) drops gradually. When the grayscale gk is equal to or greater than the predetermined grayscale gs, ΔV12(gk)<0V is set, and the relation ΔV12(gk)≤ΔV12(gk+1) is satisfied.

In other words, when the grayscale gk is between gs and n, the second voltage V2(gk) is controlled to remain unchanged, and the voltage difference ΔV12(gk) between the first voltage V1(gk) and the second voltage V2(gk) is greater than 0. When the grayscale gk is increased, the voltage difference ΔV12(gk) between the first voltage V1(gk) and the second voltage V2(gk) drops gradually.

In FIG. 8B, the horizontal axis represents the first voltage V1(gk) applied to the first pixel, and the vertical axis represents the second voltage V2(gk) applied to the second pixel, and a voltage difference ΔV12 (gk)=V1 (gk)−V2 (gk) is set, wherein 0≤gk≤n, and gk and n are integers greater than 0, and gk is the grayscale of the pixel displayed by the liquid crystal display device, and n stands for the highest-brightness grayscale. For example, n is 256. The status of applying the first voltage V1(gk) and second voltage V2(gk) is shown in the figure. When the grayscale gk is smaller than a predetermined grayscale gs, ΔV12(gk)>0V is set, and the relation ΔV12(gk)=ΔV12(gk+1) is satisfied. In other words, when the grayscale gk is between 0 and gs, the first voltage V1(gk) is greater than second voltage V2(gk). When the grayscale gk is increased, the voltage difference ΔV12(gk) between the first voltage V1(gk) and the second voltage V2(gk) remains unchanged. When the grayscale gk is equal to or greater than the predetermined grayscale gs, ΔV12(gk)>0V is set, and the relation ΔV12(gk)<ΔV12(gk+1) is satisfied. In other words, when the grayscale gk is between gs and n, the second voltage V2(gk) is controlled to remain unchanged, and the voltage difference ΔV12(gk) between the first voltage V1(gk) and the second voltage V2(gk) is greater than 0. When the grayscale gk is increased, the voltage difference ΔV12(gk) between the first voltage V1(gk) and the second voltage V2(gk) drops gradually.

Since the transmittance of the liquid crystal display device increases with the voltage, therefore the predetermined grayscale gs can be determined by its corresponding applied voltage. For example, if the applied first voltage V1(gk) reaches a voltage value Vs(gs) of the predetermined grayscale gs, then the status of applying a voltage as shown in FIGS. 8A and 8B may be used to control the liquid crystal display device. With the aforementioned method, the first voltage applied to the first sub-pixel and the second voltage applied to the second sub-pixel can be controlled, so that when the grayscale is low, an appropriate voltage difference is provided to improve the γ characteristic of different viewing angles of the liquid crystal display device. When the displayed grayscale reaches the predetermined grayscale (such as when the predetermined grayscale gs is greater than 128), the voltage applied to the second sub-pixel remains unchanged, and just the voltage applied to the first sub-pixel is used to adjust the display status, so as to improve the convenience of the liquid crystal display device and maintain an excellent display effect.

If a pixel of the liquid crystal display device is divided into three sub-pixels as shown in FIG. 4, the third voltage V3(gk) is applied to the third sub-pixel in addition to the first voltage V1(gk) and the second voltage V2(gk) applied to the first sub-pixel and the second sub-pixel. When the grayscale gk is smaller than the predetermined grayscale gs, the relations ΔV13(gk)>0V, and ΔV12(gk)>ΔV13(gk) are satisfied. When the grayscale gk is equal to or greater than the predetermined grayscale gs, ΔV13(gk)<0V is set, and the relation ΔV13(gk)<ΔV13(gk+1) is satisfied.

Figure 9:
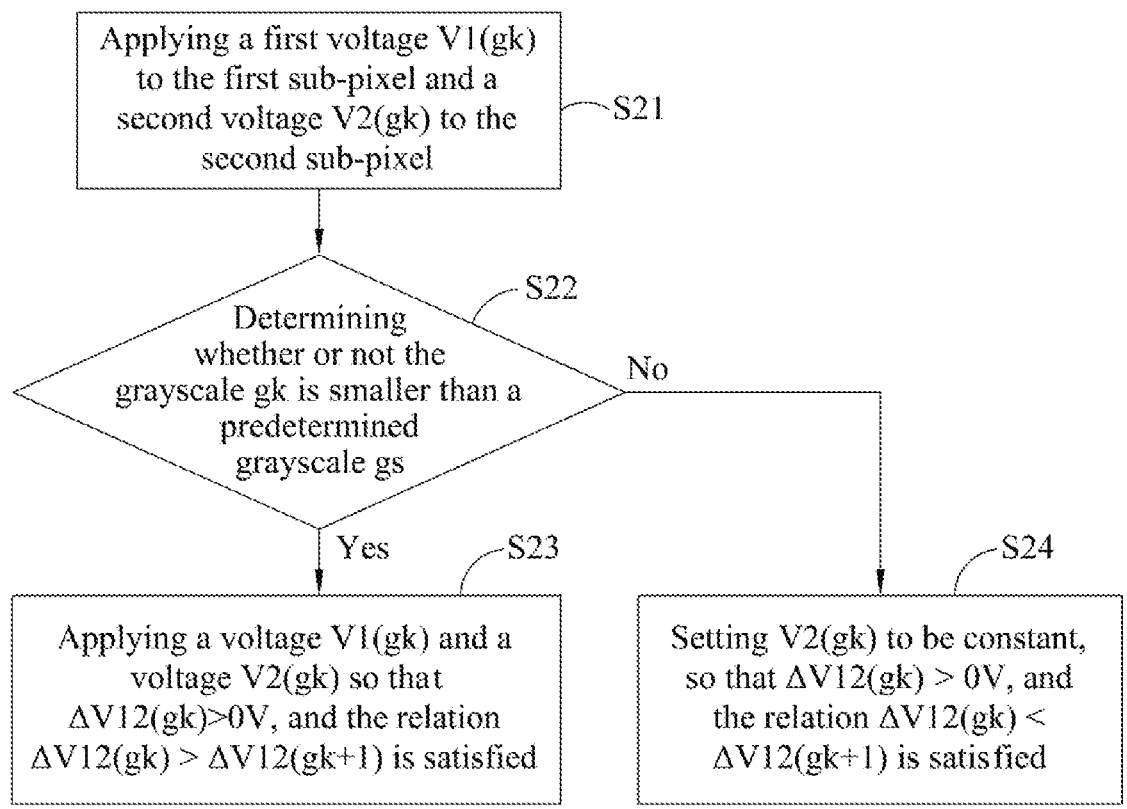
FIG. 9 is a flow chart of another further liquid crystal display device driving method in accordance with a preferred embodiment of the present invention.

With reference to FIG. 9 for a flow chart of another liquid crystal display device driving method in accordance with a preferred embodiment of the present invention, the liquid crystal display device driving method is applicable for the liquid crystal display device as shown in FIGS. 1 and 2, and the liquid crystal display device includes a liquid crystal layer 11, and each pixel P includes a first sub-pixel P1 and a second sub-pixel P2, and a first source line SL1 and a second source line SL2 provide a voltage signal to the first sub-pixel P1 and the second sub-pixel P2 separately, and a same scan signal is provided to the first sub-pixel P1 and the second sub-pixel P2 through the gate line GL, and a voltage is applied to the first pixel P1 on the liquid crystal layer 11 through the first electrode 12a and a voltage is applied to the second pixel P2 on the liquid crystal layer 11 through the second electrode 12b. The liquid crystal display device driving method includes the following steps (S21-S24):

Step S21: Applying a first voltage V1(gk) to the first sub-pixel and a second voltage V2(gk) to the second sub-pixel.

Step S22: Determining whether or not the grayscale gk is smaller than a predetermined grayscale gs. Like the previous preferred embodiment, Step S22 determines whether or not the grayscale is smaller than the predetermined grayscale gs or making the determination by comparing if the applied first voltage V1(gk) has reached a voltage value Vs(gs) of the predetermined grayscale gs.

If yes, go to Step S23: Applying a voltage V1(gk) and a voltage V2(gk) so that ΔV12(gk)>0V, and the relation ΔV12(gk)>ΔV12(gk+1) is satisfied.

If no, go to Step S24: Setting V2(gk) to be constant, so that ΔV12(gk)>0V, and the relation ΔV12(gk)<ΔV12(gk+1) is satisfied.

The aforementioned step may be executed according to the voltage control status as shown in FIG. 8A. If so, Step S23 satisfies the relation ΔV12(gk)=ΔV12(gk+1), and Step S24 also satisfies the relation ΔV12(gk)<ΔV12(gk+1). In addition, if the pixel is divided into three or more sub-pixels, the voltage control as described in Steps S23 and S24 has to add the voltage control of the third sub-pixel. When the grayscale gk is smaller than the predetermined grayscale gs, the voltage V1(gk) and voltage V3(gk) are applied, so that ΔV13(gk)>0V, and the relation ΔV12(gk)>ΔV13(gk) is satisfied. When the grayscale gk is equal to or greater than the predetermined grayscale gs, V3(gk) is set unchanged, such that $\Delta V13(gk)>0V$, and the relation $\Delta V13(gk)<\Delta V13(gk+1)$ is satisfied.

It is noteworthy that the description of a preferred embodiment may focus on a certain part while the other preferred embodiment has not given the details, and thus it is recommended to reference the relevant part from the related description of other preferred embodiments.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A liquid crystal display device, comprising a liquid crystal layer, wherein the liquid crystal layer is divided into a plurality of pixels and displaying in a normal-black manner, and the plurality of pixels include a plurality of electrodes applying voltages to the liquid crystal layer, wherein:

each of the pixels comprises a first sub-pixel and a second sub-pixel, and the voltages are applied to the liquid crystal layer of each pixel respectively; when each of the pixels displays a grayscale gk, the voltages applied to the liquid crystal layer of the first sub-pixel and the second sub-pixel of each pixel are V1(gk) and V2(gk) respectively, and a voltage difference between V1(gk) and V2(gk) is $\Delta V12(gk)$, $\Delta V12\ (gk)=V1\ (gk)-V2\ (gk)$ is set, wherein $0 \leq gk \leq n$, gk and n are integers greater than 0, and n stands for a highest-brightness grayscale, and when the grayscale gk is smaller than a predetermined grayscale gs, $\Delta V12(gk)>0V$ is set, and $\Delta V12(gk)>\Delta V12(gk+1)$ is satisfied, and when the grayscale gk is equal to or greater than the predetermined grayscale gs, $\Delta V12(gk)=0V$ is set, and $\Delta V12(gk)=\Delta V12(gk+1)$ is satisfied;

wherein when the voltage V1(gk) is smaller than a predetermined voltage Vs, $\Delta V12(gk)>0V$ is set, and $\Delta V12(gk)>\Delta V12(gk+1)$ is satisfied, and when the voltage V1(gk) is equal to or greater than the predetermined voltage Vs, $\Delta V12(gk)=0V$ is set, and $\Delta V12(gk)=\Delta V12(gk+1)$ is satisfied.

2. The liquid crystal display device of claim 1, wherein each of the pixels further comprises a third sub-pixel which is different from the first sub-pixel and the second sub-pixel; when each of the pixels displays the grayscale gk, a voltage V3(gk) is applied to the liquid crystal layer of the third sub-pixel, and $\Delta V13(gk)$ is a voltage difference between V1(gk) and V3(gk), and $\Delta V13(gk)=V1(gk)-V3(gk)$ is set, and when the grayscale gk is smaller than the predetermined grayscale gs, $\Delta V13(gk)>0V$ is set, and $\Delta V12(gk)>\Delta V13(gk)$ is satisfied, and when the grayscale gk is equal to or greater than the predetermined grayscale gs, $\Delta V13(gk)=0V$ is set, and $\Delta V12(gk)=\Delta V13(gk)$ is satisfied.

3. The liquid crystal display device of claim 1, wherein the first sub-pixel comprises a first transistor electrically coupled to a first source line, and the second sub-pixel comprises a second transistor electrically coupled to a second source line, and the first source line and the second source line are parallel to each other and provide a voltage signal to the first sub-pixel and the second sub-pixel separately, and the first transistor and the second transistor are electrically coupled to a gate line and provide a same scan signal to the first sub-pixel and the second sub-pixel.

4. The liquid crystal display device of claim 1, wherein the highest-brightness grayscale n is 256.

5. The liquid crystal display device of claim 1, wherein the predetermined grayscale gs is 128.

6. The liquid crystal display device of claim 1, wherein the plurality of pixels are array pixels.

7. A liquid crystal display device, comprising a liquid crystal layer, wherein the liquid crystal layer is divided into a plurality of pixels and displayed in a normal-black manner, and the plurality of pixels include a plurality of electrodes applying a voltage to the liquid crystal layer, wherein:

each of the pixels comprises a first sub-pixel and a second sub-pixel, and a voltage is applied to the liquid crystal layer of each pixel separately;

when each of the pixels displays a grayscale gk, the voltages applied to the liquid crystal layer of the first sub-pixel and the second sub-pixel of each pixel are V1(gk) and V2(gk) respectively, and a voltage difference between V1(gk) and V2(gk) is $\Delta V12(gk)$, $\Delta V12\ (gk)=V1\ (gk)-V2\ (gk)$ is set, wherein $0 \leq gk \leq n$, gk and n are integers greater than 0, and n stands for a highest-brightness grayscale, and when the grayscale gk is smaller than a predetermined grayscale gs, $\Delta V12(gk)>0V$ is set, and $\Delta V12(gk)=\Delta V12(gk+1)$ is satisfied, and when the grayscale gk is equal to or greater than the predetermined grayscale gs, $\Delta V12(gk)=0V$ is set, and $\Delta V12(gk)=\Delta V12(gk+1)$ is satisfied;

wherein when the voltage V1(gk) is smaller than a predetermined voltage Vs, $\Delta V12(gk)>0V$ is set, and $\Delta V12(gk)>\Delta V12(gk+1)$ is satisfied, and when the voltage V1(gk) is equal to or greater than the predetermined voltage Vs, $\Delta V12(gk)=0V$ is set, and $\Delta V12(gk)=\Delta V12(gk+1)$ is satisfied.

8. The liquid crystal display device of claim 7, wherein each of the pixels further comprises a third sub-pixel which is different from the first sub-pixel and the second sub-pixel; when each of the pixels displays the grayscale gk, a voltage V3(gk) is applied to the liquid crystal layer of the third sub-pixel, and $\Delta V13(gk)$ is a voltage difference between V1(gk) and V3(gk), $\Delta V13(gk)=V1(gk)-V3(gk)$ is set, and when the grayscale gk is smaller than the predetermined grayscale gs, $\Delta V13(gk)>0V$ is set, and $\Delta V12(gk)>\Delta V13(gk)$ is satisfied, and when the grayscale gk is equal to or greater than the predetermined grayscale gs, $\Delta V13(gk)=0V$ is set, and $\Delta V12(gk)=\Delta V13(gk)$ is satisfied.

9. The liquid crystal display device of claim 7, wherein the first sub-pixel comprises a first transistor electrically coupled to a first source line, and the second sub-pixel comprises a second transistor electrically coupled to a second source line, and the first source line and the second source line are parallel to each other and provide a voltage signal to the first sub-pixel and the second sub-pixel separately, and the first transistor and the second transistor are electrically coupled to a gate line and provide a same scan signal to the first sub-pixel and the second sub-pixel.

10. The liquid crystal display device of claim 7, wherein the highest-brightness grayscale n is 256.

11. The liquid crystal display device of claim 7, wherein the predetermined grayscale gs is 128.

12. The liquid crystal display device of claim 7, wherein the plurality of pixels are array pixels.

13. A liquid crystal display device, comprising a liquid crystal layer, wherein the liquid crystal layer is divided into a plurality of pixels and displayed in a normal-black manner, and the plurality of pixels having a plurality of electrodes applying a voltage to the liquid crystal layer, wherein:

each of the pixels comprises a first sub-pixel and a second sub-pixel, and a voltage is applied to the liquid crystal layer of each pixel separately;

when each of the pixels displays a grayscale gk, the voltages applied to the liquid crystal layer of the first sub-pixel and the second sub-pixel of each pixel are V1(gk) and V2(gk) respectively, and a voltage difference between V1(gk) and V2(gk) is $\Delta$V12(gk), $\Delta$V12(gk)=V1(gk)−V2(gk) is set, wherein 0≤gk≤n, gk and n are integers greater than 0, and n stands for a highest-brightness grayscale, and when the grayscale gk is smaller than a predetermined grayscale gs, $\Delta$V12(gk)>0V is set, and $\Delta$V12(gk)≥$\Delta$V12(gk+1) is satisfied, and when the grayscale gk is equal to or greater than the predetermined grayscale gs, $\Delta$V12(gk)=0V is set, and $\Delta$V12(gk)=$\Delta$V12(gk+1) is satisfied;

wherein when the voltage V1(gk) is smaller than the predetermined voltage Vs, $\Delta$V12(gk)>0V is set, and $\Delta$V12(gk)≥$\Delta$V12(gk+1) is satisfied, and when the voltage V1(gk) is equal to or greater than the predetermined voltage Vs, $\Delta$V12(gk)=0V is set, and $\Delta$V12(gk)=$\Delta$V12(gk+1) is satisfied.

14. The liquid crystal display device of claim 13, wherein each of the pixels further comprises a third sub-pixel which is different from the first sub-pixel and the second sub-pixel; when each of the pixels displays the grayscale gk, a voltage V3(gk) is applied to the liquid crystal layer of the third sub-pixel, and a voltage difference between V1(gk) and V3(gk) is $\Delta$V13(gk), $\Delta$V13(gk)=V1(gk)−V3(gk) is set, and when the grayscale gk is smaller than the predetermined grayscale gs, $\Delta$V13(gk)>0V is set, and $\Delta$V12(gk)>$\Delta$V13(gk) is satisfied, and when the grayscale gk is equal to or greater than the predetermined grayscale gs, $\Delta$V13(gk)=0V is set, and $\Delta$V12(gk)=$\Delta$V13(gk) is satisfied.

15. The liquid crystal display device of claim 13, wherein the first sub-pixel comprises a first transistor electrically coupled to a first source line, and the second sub-pixel comprises a second transistor electrically coupled to a second source line, and the first source line and the second source line are parallel to each other and provide a voltage signal to the first sub-pixel and the second sub-pixel separately, and the first transistor and the second transistor are electrically coupled to a gate line and provide a same scan signal to the first sub-pixel and the second sub-pixel.

16. The liquid crystal display device of claim 13, wherein the highest-brightness grayscale n is 256.

17. The liquid crystal display device of claim 13, wherein the predetermined grayscale gs is 128.

* * * * *